Patented Oct. 2, 1945

2,386,055

UNITED STATES PATENT OFFICE 2,386,055

SEPARATION OF TERTIARY OLEFINS FROM HYDROCARBON MIXTURES

Henry O. Mottern, Elizabeth, N. J., assignor to Standard Oil Development Company, a corporation of Delaware No Drawing. Application May 17, 1939,
Serial No. 274,213

3 Claims. (Cl. 196—40)

The present invention provides a practical and economical process for the removal of tertiary olefins from hydrocarbon mixtures containing tertiary olefins and from mixtures of olefinic or paraffinic hydrocarbons containing tertiary olefins. Tertiary olefins are removed from hydrocarbon mixtures containing them with equal facility by the use of this invention either in liquid or vapor phase method.

In the production of alcohols and ethers from unsaturated hydrocarbons, it is customary to bring about the hydration of the olefin by means of an acid catalyst such as sulfuric acid or by absorption in acid and regeneration as alcohol after dilution. The presence of tertiary olefins, however, is objectionable in such processes because an acid of sufficient strength to hydrate a secondary or primary olefin polymerizes instead of hydrates a tertiary olefin. Polymerization is objectionable for the reasons that polymers are hard to remove and contaminate the hydration product, and during polymerization side reactions occur forming copolymers between the tertiary and secondary and/or primary hydrocarbons, thus reducing the yield of hydration products. Heretofore it has been customary to remove the tertiary olefins from hydrocarbon mixtures containing tertiary olefins by first subjecting the hydrocarbon mixture to the action of dilute mineral acid solutions of from about 25% to 75% concentration and then to hydrate the remaining olefin. This has been accomplished by passing the gases or vaporized olefin mixture into the acid or by contacting liquid olefin with the acid. These methods usually remove only about 50% to 80% of the total tertiary olefins present, especially where olefins above four carbon atoms are present. A more efficient removal of tertiary olefins by these processes would necessitate the use of a more concentrated acid which would at the same time remove substantial quantities of the secondary olefins which removal would in consequence reduce the yield of desired secondary olefin hydration products. Thus, the prior processes must strike an average between these two disadvantages.

A method has now been found whereby substantially complete removal of the tertiary olefins from hydrocarbon mixtures may be accomplished without any loss of secondary or primary base olefins. This method comprises condensing the tertiary base olefin with formaldehyde, its homologues, or other aldehydes such as furfuraldehyde or benzaldehyde in the presence of an acidic catalyst. It has been found that the speed of reaction between tertiary olefins and aldehydes is so rapid when compared with the reaction between secondary and primary base olefins and aldehydes, that the reaction between stoichiometrical proportions of tertiary olefins and aldehyde is complete before the reaction between secondary or primary olefins and aldehydes is initiated, or, in other words, aldehydes in the presence of tertiary, secondary and primary base olefins preferentially react with the tertiary olefins. This reaction rate remains relatively the same under all conditions of reaction where the product is a tertiary olefin-formaldehyde condensate as distinguished from a tertiary olefin polymer. The process is applicable to any liquid or gaseous mixture of hydrocarbons containing a tertiary base olefin such as mixtures of gaseous olefins, tertiary olefins with normal olefins and saturated hydrocarbons, tertiary olefins with unsaturated and saturated cyclic hydrocarbons and tertiary olefins with aromatic hydrocarbons. The aldehyde, preferably formaldehyde, may be in gaseous form, aqueous solution or as polymers or other compounds decomposing to yield the aldehyde. The reaction is catalyzed by any acidic substance. As examples of acidic substances there are mineral acids such as sulfuric acid or other sulfur containing acid, halogen acids such as hydrochloric, hydrobromic or more complex acids such as hydrofluoboric acid and hydroflosilicic acid, amphoteric acidic salts, such as antimony chloride and aluminum chloride, and organic acids normally highly ionized in water such as trichloracetic acid, sulfonic acids and the like. By the use of this method, polymerization of the tertiary olefin and copolymerization between the tertiary olefin and other olefins present is avoided. At least 90% to 95% of the tertiary olefin is removed from the hydrocarbon mixture free from any determinable amounts of other olefins.

By first employing this method for removing the tertiary olefins, the secondary olefins can then be hydrated without interference from tertiary olefins.

As an example of the practical advantage to be obtained by this invention, a sample of cracked $C_5$ cut naphtha was treated by passing the naphtha thru sufficient 65–75% sulfuric acid at 25° C. to provide an excess of acid over that required for absorption of tertiary olefins on a mol per mol basis for the purpose of removing the tertiary olefins. The quantity of tertiary olefins removed by this method varies between 50–80% usually being about 60% based upon the tertiary olefins contained in the original naphtha. The unreacted naphtha was then passed to 88% sulfuric acid for the purpose of hydrating the secondary olefins to alcohol. The amount of secondary alcohol recovered from the 88% acid amounted to about 30% of the theoretical yield based upon the secondary olefins present in the original $C_5$ naphtha. It is thought that the low yield in secondary alcohol results from the loss of secondary base olefins through copolymerization with tertiary base olefins. The same quantity of the C₅ cut was then condensed with formaldehyde in the ratio of between one and two mols CH₂O per mol tertiary olefin content of the naphtha in the presence of 25% sulfuric acid. The unreacted hydrocarbons were then recovered by distillation or by extracting the formaldehyde condensation product from the naphtha by suitable solvent. These unreacted hydrocarbons were then subjected to hydration in the presence of 88% sulfuric acid and there was recovered secondary alcohol as a 95% yield based on the total secondary olefin present in the original quantity of C₅ naphtha. This example indicates the extent to which the yield of hydration products of secondary olefins is lowered in the prior art processes through the copolymerization of secondary olefins with tertiary olefins.

The following is illustrative of the invention as applied in the separation of trimethyl ethylene from close cut C₅ naphtha:

*Example 1*

1125 grams of cracked C₅ cut naphtha containing 212 grams of tertiary olefin, as determined by removing the tertiary olefin as the chloride with concentrated hydrogen chloride, was reacted with a slurry of paraformaldehyde in 25% sulfuric acid at 25° C. by passing the naphtha into an agitator containing the slurry of paraformaldehyde operating at 1750 R. P. M. and agitating the mixture for one hour. The paraformaldehyde was present in the slurry in an amount sufficient to produce 182 grams of formaldehyde or 2 mols of formaldehyde per mol of tertiary olefin present in the C₅ cut. At the end of the reaction period agitation was stopped and the aqueous acid and unreacted naphtha separated on standing into an upper layer of naphtha and a lower layer of aqueous acid which were separated by decantation. The condensation product of trimethyl ethylene with formaldehyde, being soluble in the unreacted naphtha, was recovered therefrom as a bottoms after removing the spent naphtha by distillation. 416 grams of the condensation product or a yield of 95% based upon the total tertiary olefin present in the C₅ cut was recovered.

Although the optimum conditions have been given above for the removal of trimethyl ethylene from C₅ cut, these identical conditions do not necessarily obtain for the removal of tertiary hydrocarbons from other hydrocarbon mixtures. The time and temperature of reaction will vary in accordance with the strength of acid used. Varying amounts of concentrated sulfuric acid have been used as the catalyst for bringing about a reaction between unsaturated hydrocarbons and formaldehyde to yield hard insoluble resins. In order to accomplish the process of this invention, however, the acid must be diluted to at least 65% although dilutions as low as 0.5% may be used, the preferred range of acid concentrations lying between 25 and 50%. The speed of reaction depends primarily upon acid concentration and secondarily upon temperature. The higher the acid concentration and temperature the more quickly will the reaction come to completion. The temperature at which the reaction is caused to take place may vary between 0° C. and 100° C. although the preferred temperature is slightly above room temperature or 25° C. With 65% acid at 100° C. isobutylene and formaldehyde may be caused to condense in a very few minutes, but with 5% acid at 0° C. the reaction is not completed for several days. Instead of separating the unreacted naphtha and condensation product of tertiary olefins and aldehydes by distillation, the condensation product can be removed from the naphtha by solvent extraction. This is accomplished by shaking or otherwise agitating the unreacted naphtha with a suitable solvent for the tertiary olefin and aldehyde condensation product, such as ethylene glycol, which is immiscible with the unreacted hydrocarbons.

The spent naphtha from the above disclosed process still contains unsaturated hydrocarbons of the nature of primary and secondary olefins which may be economically converted into useful products. They may be converted into alcohols by hydrolysis in the presence of sulfuric acid of the proper concentration acting as a catalyst or they may be condensed with additional aldehyde either at the same temperature and with a higher acid concentration than that used with the tertiary olefins or with the same acid concentration but higher temperature than that required to condense the tertiary olefins with aldehydes.

With these teachings in mind, those skilled in the art can readily adjust the time of reaction to suit specific acid concentration and temperature limitations.

The above disclosure and examples are given for the purposes of illustration only and are not to be construed as in any way limiting the invention. Now, having fully described the principles of this invention, what is claimed is:

1. The method of removing tertiary olefins from refinery distillates which consists in contacting the distillate with formaldehyde in sulfuric acid of from 25 to 50% concentration at a temperature between 0–100° C. at a time sufficient to condense the tertiary olefin with the formaldehyde without substantial condensation of other olefins with formaldehyde, the amount of formaldehyde present in the sulfuric acid being in the ratio of from 1¼ to 1¾ mols formaldehyde per mol tertiary olefin in the distillate and separating the spent distillate from the reaction product.

2. The method of removing trimethyl ethylene from C₅ cut naphtha which consists in contacting the C₅ cut with formaldehyde in sulfuric acid of from ½ to 65% concentration at a temperature between 0–100° C. for a time sufficient to condense the tertiary olefin with the formaldehyde without substantial condensation of secondary olefins with formaldehyde, the amount of formaldehyde present in the sulfuric acid being in the ratio of from 1¼ to 1¾ mols formaldehyde per mol of trimethyl ethylene in the C₅ cut and separating the spent naphtha from the reaction products.

3. The method of removing trimethyl ethylene from C₅ cut naphtha which consists in contacting the naphtha with formaldehyde in sulfuric acid of from 20–35% concentration at a temperature between 20–40° C. for from 20–45 minutes, the amount of formaldehyde present in the sulfuric acid being in the ratio of from 1¼ to 1¾ mols formaldehyde per mol trimethyl ethylene in the naphtha and separating the spent naphtha from the reaction products.

HENRY O. MOTTERN.